United States Patent
Zwayer et al.

[11] Patent Number: 6,089,484
[45] Date of Patent: Jul. 18, 2000

[54] BUSHING FOR FISHING REELS

[75] Inventors: Kent Lee Zwayer, Tulsa; Thomas Audley Pulliam, Broken Arrow; Scott T. Merrill, Mounds, all of Okla.

[73] Assignee: Zebco Division of Brunswick Corporation, Lake Forest, Ill.

[21] Appl. No.: 08/971,069

[22] Filed: Nov. 14, 1997

[51] Int. Cl.[7] .................................................. A01K 89/00
[52] U.S. Cl. ........................ 242/321; 242/239; 242/322; 384/296
[58] Field of Search ..................... 242/239, 310, 242/312, 317, 318, 321, 322; 384/295, 296

[56] References Cited

U.S. PATENT DOCUMENTS

| | | | |
|---|---|---|---|
| 1,738,037 | 12/1929 | Collins | 384/296 |
| 1,910,300 | 5/1933 | Marles | 384/296 |
| 2,255,971 | 9/1941 | Hall | 384/296 X |
| 3,198,456 | 8/1965 | Wood | 242/239 |
| 3,298,628 | 1/1967 | Harrington et al. | 242/239 |
| 3,953,089 | 4/1976 | Dainin | 384/296 X |
| 4,154,413 | 5/1979 | Hull . | |
| 4,156,510 | 5/1979 | Hull . | |
| 4,624,585 | 11/1986 | Nix et al. | 384/295 X |
| 4,810,106 | 3/1989 | Ohike | 384/295 X |
| 5,388,915 | 2/1995 | Huber | 384/295 X |
| 5,577,843 | 11/1996 | Leininger et al. | 384/296 X |
| 5,829,317 | 11/1998 | Vreeken et al. | 384/296 X |

*Primary Examiner*—Donald P Walsh
*Assistant Examiner*—Emmanuel M. Marcelo
*Attorney, Agent, or Firm*—Fellers, Snider, Blankenship, Bailey & Tippens

[57] ABSTRACT

A bushing for a fishing reel comprising: a body having an aperture therethrough for receiving a shaft such that the shaft is movable in the aperture; a plurality of chamfers extending from the body for securing the bushing in the fishing reel; an exterior contacting surface provided on the body; and at least one cam lobe provided on the body. The inventive bushing is particularly well-suited for placement on the spool hub of a spincast-type fishing reel such that the bushing operably receives and retains the reel's main operating shaft.

20 Claims, 6 Drawing Sheets

BUSHING FOR FISHING REELS

FIELD OF THE INVENTION

The present invention relates to bushings for fishing reels. More particularly, but not by way of limitation, the present invention relates to bushings for spincast-type fishing reels.

BACKGROUND OF THE INVENTION

Spincast fishing reels are well known in the art. A spincast reel will typically include: a central frame; a front cover positionable over at least the front face of the frame and having a tapered forward wall; a back cover positionable over at least the back face of the frame; a casting button operably projecting from the back cover; and a crank handle extending laterally from the side of the fishing reel. Most of the reel's operating structures and operating mechanisms are either mounted on, formed on, or mounted through the frame. The crank handle is operable for winding a fishing line around a line spool contained within the spincast reel. The line spool is typically mounted on a spool hub projecting forwardly from the frame.

A spincast reel will also include a foot structure for securing the reel on a fishing rod. The foot structure typically extends from either the bottom of the frame or the bottom of the back cover. Spincast reels having the foot extending from the bottom of the back cover are typically configured such that, when the reel is assembled, the frame is almost completely housed within the front and back covers.

The operating structures and mechanisms contained in a spincast reel typically include: an elongate main shaft slidably and rotatably extending through the spool hub; a spinnerhead secured to the forward end of the main shaft; a pinion gear (typically a helical gear) positioned around the main shaft; a crankshaft extending into the side of the reel and through a crankshaft boss provided on the rearward face of the frame; an interior drive gear (e.g., a face gear) secured on the crankshaft; an anti-reverse mechanism (e.g., a ratchet/pawl-type mechanism) associated with the crankshaft for preventing reverse rotation of the crank handle and crankshaft; and an adjustable drag system. The crank handle is secured on the exterior end of the crankshaft.

The pinion gear is typically retained in the reel adjacent the rear face of the frame. The pinion gear is keyed on the main shaft for imparting rotational movement to the main shaft while allowing the shaft to slide longitudinally through the frame. The drive gear operably engages the pinion gear such that rotational movement is imparted to the main shaft by turning the crank handle.

The spinnerhead attached to the forward end of the main shaft is operable for winding the fishing line around the reel spool. While winding, the spinnerhead is positioned over the spool. When the user turns the crank handle, the rotational movement of the handle is mechanically transferred, by means of the crankshaft, the drive gear, the pinion gear, and the main shaft, to the spinnerhead. The spinnerhead will typically include a grasping means for holding and positioning the fishing line such that, as the spinnerhead rotates, the spinnerhead raps the line around the spool. The grasping means will commonly consist of either (a) a set of line-grasping notches formed in the rearward edge of the spinnerhead or (b) at least one spring-loaded pickup pin projecting laterally through the spinnerhead side wall.

A spincast reel will also typically include means for biasing the main shaft rearwardly toward engagement with the casting button. Such means commonly consists of a spring positioned around the rearward portion of the main shaft. The spring is typically attached to, or retained by, the rearward end of the main shaft such that the spring also operates to hold the pinion gear against the frame.

When casting with a spincast reel, the user initially presses and holds the thumb button whereby the main shaft and the spinnerhead move forward and the spinnerhead clamps the fishing line against the tapered forward wall of the front cover. The line is thus prevented from moving outward (i.e., paying out) during the power portion of the casting motion. The forward movement of the main shaft and of the spinnerhead also typically activates a locking mechanism which temporarily (a) limits the rearward movement of the spinnerhead such that the spinnerhead is prevented from returning to its winding position and (b) holds the line-grasping mechanism in a disengaged (i.e., non-grasping) position.

At the end of the casting motion, the user releases the thumb button and thereby allows the shaft spring to move the main shaft and the spinnerhead rearward a sufficient distance such that the fishing line is no longer clamped against the forward wall of the front cover. With the line thus released and the spinnerhead prevented from grasping or otherwise engaging the fishing line, the line flows freely over the forward end of the line spool and through the line opening provided in the forward end of the front cover.

After casting, the user returns the spinnerhead and the line-grasping mechanism to their winding positions by simply turning the crank handle. A cam lobe or other release mechanism is typically provided on the spool hub, or elsewhere in the reel, for releasing the spinnerhead locking mechanism in response to the rotational movement of the spinnerhead.

Recently, fiberglass and other relatively low cost materials have been used for producing the frames employed in some spincast fishing reels. Unfortunately, the wear resistance provided by these low cost materials is relatively low. Thus, the sliding and rotating movement of the main shaft and the operation of the line grasping mechanism cause the spool hub to wear at an undesirably rapid rate.

In addition, the low cost materials currently used for producing spincast frames typically exhibit a relatively high level of frictional resistance. Thus, the contacting surfaces provided by these materials do not allow sufficiently smooth operation of the main shaft and of the line grasping mechanism.

SUMMARY OF THE INVENTION

The present invention provides a bushing which satisfies the needs and solves the problems discussed above. The inventive bushing provides highly wear-resistant, low friction contacting surfaces and is particularly well suited for use in spincast fishing reels. One embodiment of the inventive bushing is removably securable on the spool hub of a spincast fishing reel for (a) guiding and facilitating the rotational and sliding movement of the reel's main shaft and (b) operably engaging the reel's line grasping mechanism. The inventive bushing thus protects the spool hub from wear and allows desirably smooth operation of the reel's main shaft and line grasping mechanism.

In one aspect, the inventive bushing comprises (a) a body and (b) securing means, extending from the body, for securing the bushing in the fishing reel. The body has an aperture extending therethrough for receiving a shaft such that the shaft is moveable in the aperture.

In another aspect, the inventive bushing comprises (a) a body and (b) transfer means, provided on the body, for transferring a grasping mechanism included in a fishing reel. The transfer means is operable for transferring the grasping mechanism from (a) a non-grasping position wherein the grasping mechanism will not grasp the fishing line included in the fishing reel to (b) a grasping position wherein the grasping mechanism will grasp the fishing line.

In yet another aspect, the present invention provides a spincast fishing reel comprising: a frame; an elongate shaft; a hub extending from the frame and having a passage extending therethrough for receiving the shaft; a bushing for receiving and retaining the shaft for sliding and rotating movement; and securing means for securing the bushing at the end of the hub.

Further objects, features, and advantages of the present invention will be apparent upon examining the accompanying drawings and upon reading the following description of the preferred embodiments.

DESCRIPTION OF THE PREFERRED EMBODIMENTS

Figure 7:
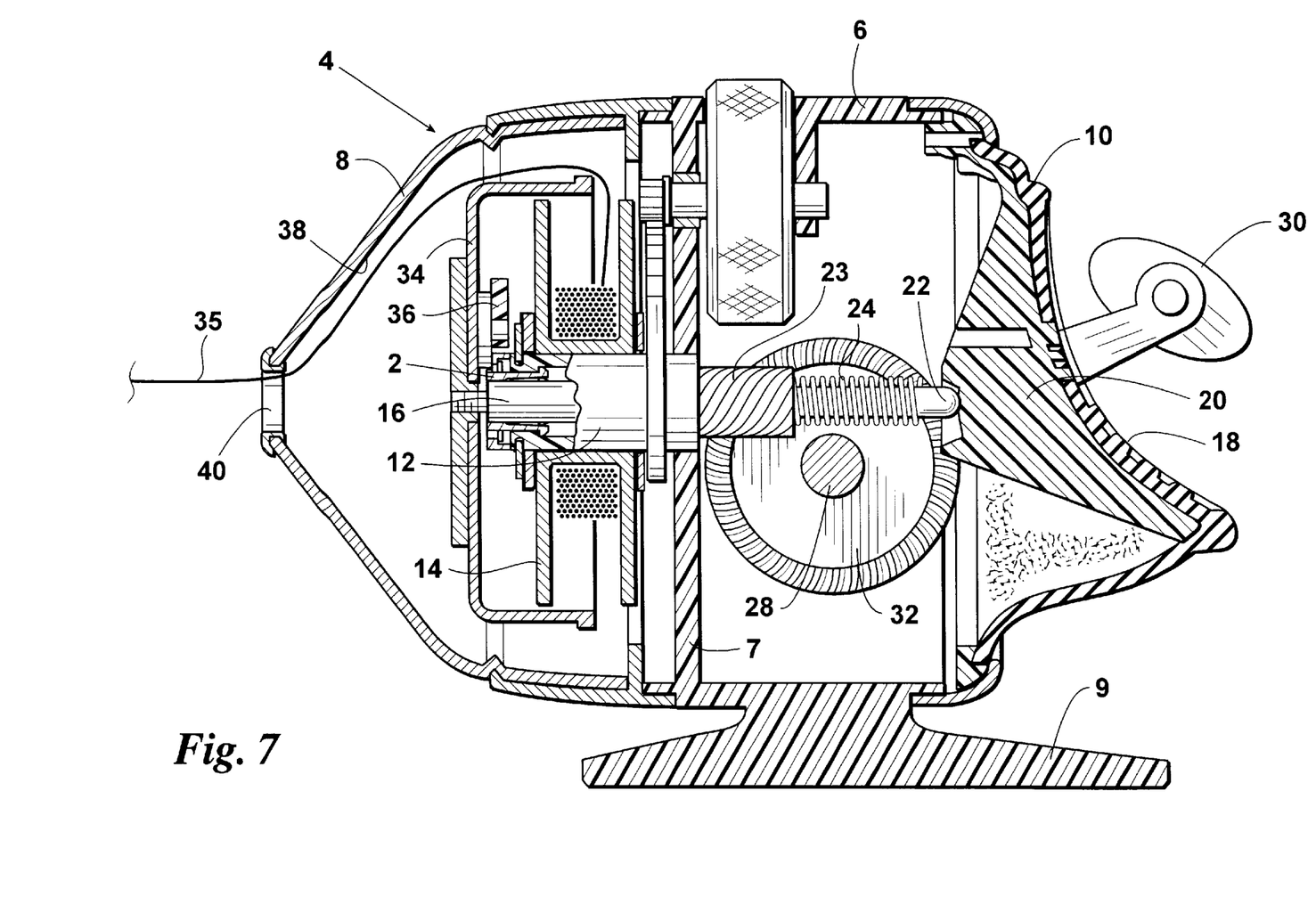
FIG. 7 provides a cutaway, elevational side view of spincast reel 4 having inventive bushing 2 installed therein.

An embodiment 2 of the inventive bushing is depicted in FIGS. 1–6. FIG. 7 depicts inventive bushing 2 installed in a spincast-type fishing reel 4. Reel 4 comprises: a body structure 6; a front cover 8 attached over the forward face of body 6; and a rear cover 10 attached over the rearward face of body 6. Body 6 includes a frame portion 7, on or through which most of the reel's operating mechanisms are mounted, and a foot structure 9 which extends from the bottom of frame 7. Foot structure 9 is used for mounting reel 4 on a fishing rod. Frame 7 includes a forwardly projecting spool hub 12 on which a line spool 14 is mounted.

As is typical with spincast-type fishing reels, reel 4 further comprises: an elongate, main operating shaft 16 rotatably and slidably extending through spool hub 12; a thumb button 18 having a forwardly projecting structure 20 which operably engages the rearward end 22 of main shaft 16; a pinion gear 23 (preferably a helical gear) positioned on main shaft 16; a spring 24 provided on the rearward end of main shaft 16 for biasing shaft 16 toward engagement with engaging structure 20; a crank shaft 28 extending laterally through frame 7; a crank handle 30 secured to an exterior end of crank shaft 28; an interior drive gear 32 positioned on crank shaft 30 for operably engaging pinion gear 23; a spinnerhead 34 secured to the forward end of main shaft 16; and a line-grasping mechanism (e.g. a pick-up pin mechanism) 36 pivotably secured in the interior of spinnerhead 34. Pinion gear 23 is keyed on main shaft 16 such that main shaft 16 can slide longitudinally through pinion gear 23 but cannot rotate independently of pinion gear 23. Thus, regardless of the longitudinal position of main shaft 16, shaft 16 can be rotated by simply turning crank handle 30.

When casting with reel 4, the user initially presses and holds thumb button 18 whereby main shaft 16 and spinnerhead 34 move forward and spinnerhead 34 clamps the fishing line 35 against the tapered forward wall 38 of front cover 8. The line is thus prevented from moving outward (i.e., paying out) during the power portion of the casting motion. At the end of the casting motion, the user releases thumb button 18 and thereby allows spring 24 to move main shaft 16 and spinnerhead 34 rearwardly such that the fishing line is no longer clamped against forward wall 38. The line then flows freely over the forward end of line spool 14 and through the opening 40 provided in front cover 8.

Inventive bushing 2 is preferably a removable, snap-fitting structure comprising: a body structure 42 having a forward end 44 and a rearward end 46; a plurality of resilient chamfers 48 projecting rearwardly from body 42; and at least one cam lobe 50 formed on forward end 44. Body structure 42 preferably includes: a cylindrical exterior wall 52; a radial shoulder 54 provided at rearward end 46; a cylindrical bore 56 extending longitudinally through the center of body structure 42; a cylindrical interior surface 58 provided in bore 56; a plurality of apertures 60 extending through body 42; and a hollow interior 62 provided in rearward side 46. The number of apertures 60 provided through body 42 is preferably equal to the number of chamfers 48 extending from body 42. As will be understood by those skilled in the art, apertures 60 are included in bushing 2 immediately adjacent the forward ends of chamfers 48 in order to facilitate the tooling of chamfers 40.

Figure 8:
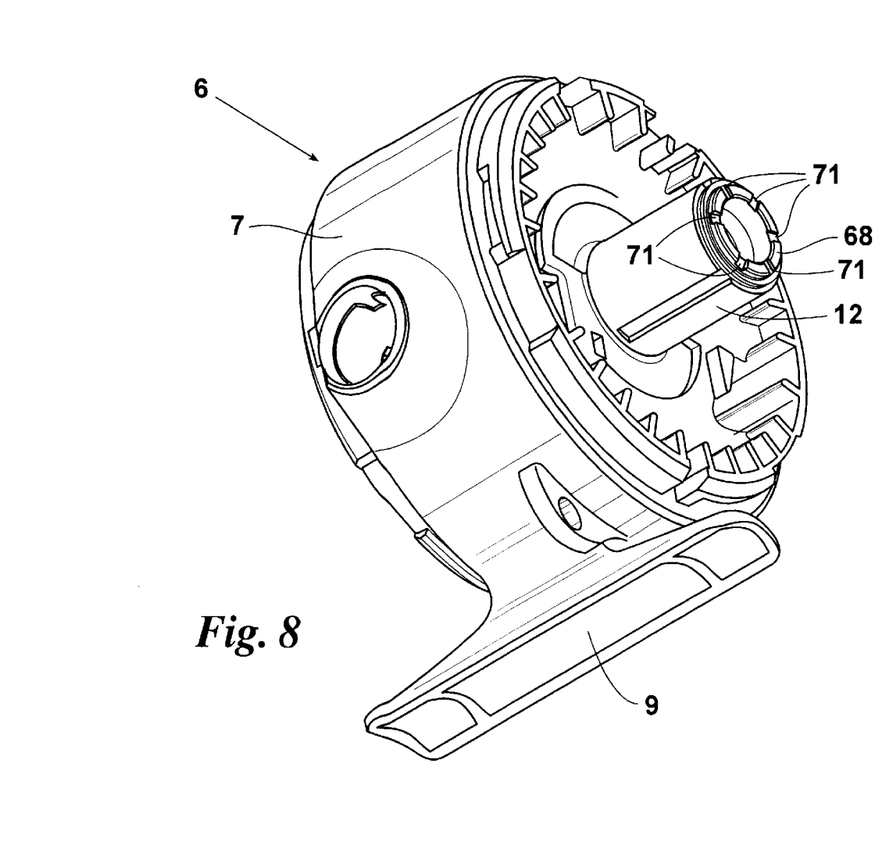
FIG. 8 provides a perspective view of a body structure 6 employed in reel 4.
Figure 9:
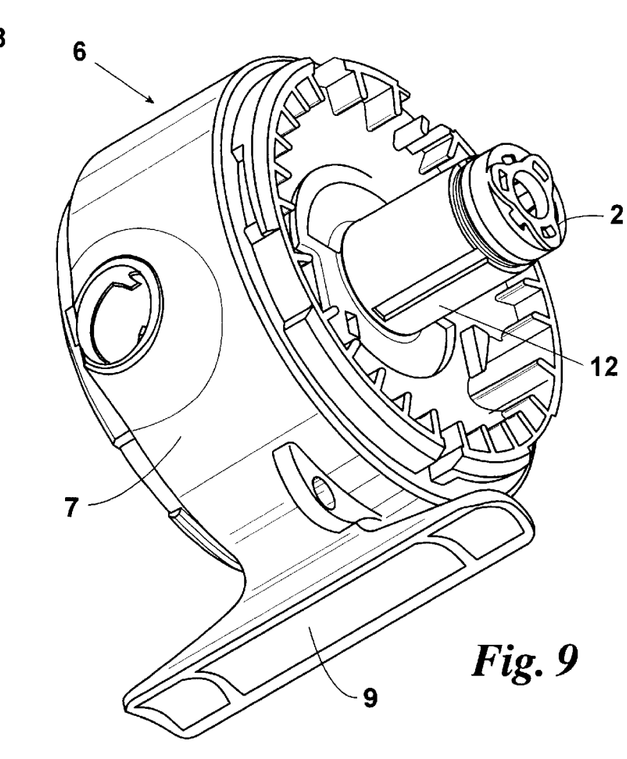
FIG. 9 provides a perspective view of body structure 6 having inventive bushing 2 attached thereto.
Figure 10:
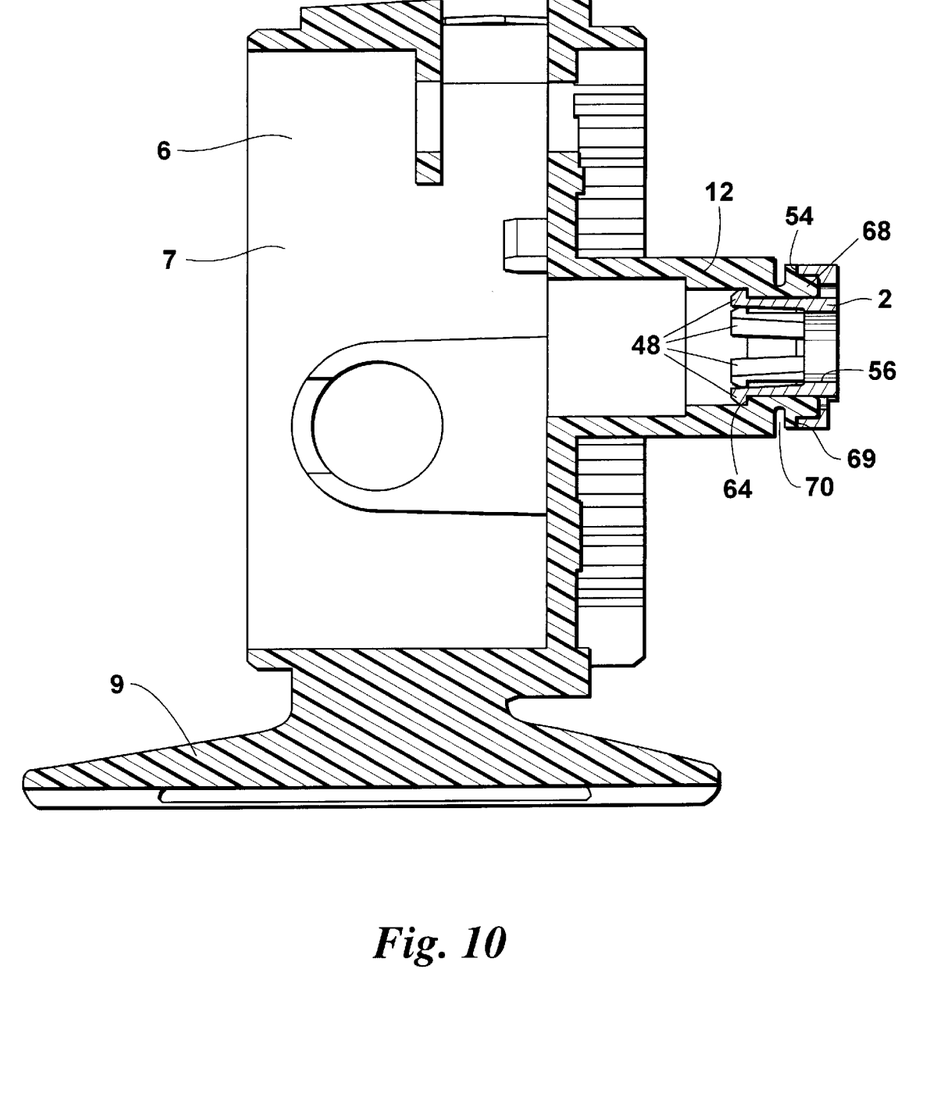
FIG. 10 provides an elevational side view of body structure 6 with inventive bushing 2 attached thereto.

As depicted in FIGS. 8–10, inventive bushing 2 is secured to the spool hub 12 of reel 4 by inserting chamfers 48 into hub 12 such that (a) the distal end 68 of hub 12 is received in the hollow interior 62 of body structure 42, (b) the rearward radial shoulder 54 of body structure 42 abuts an exterior radial shoulder 69 formed around the forward end of hub 12, and (c) chamfers 48 snap into position over an interior shoulder 64 provided in hub 12. To prevent inventive bushing 2 from rotating, a plurality of radial grooves 71 are preferably formed in the end of hub 12. Grooves 71 are sized and positioned to receive radial bosses 63 formed in the hollow interior 62 of bushing 2.

As also depicted in FIG. 10, a groove 70 is preferably formed around the exterior of spool hub 12. Groove 70 is spaced rearwardly of hub exterior shoulder 69. Groove 70 is sized and positioned to receive a resilient retaining member (e.g., an E-clip) for retaining the line spool 14 and other components mounted on spool hub 12.

When secured on spool hub 12, bushing 2 receives and retains main shaft 16 such that shaft 16 will slide and rotate against the interior cylindrical surface 58 of bushing 2. Inventive bushing 2 thus prevents main shaft 16 from contacting and wearing against spool hub 12.

The cam lobe(s) 50 provided on the forward end 44 of inventive bushing 2 function in substantially the same manner as a prior art cam lobe. As indicated above, a prior art spincast reel will commonly have a cam lobe integrally formed on the forward end of the reel's spool hub for operating a line-grasping mechanism. To provide quick engagement with line-grasping mechanism 36, a plurality of (preferably three) cam lobes 50 can be provided on inventive bushing 2. The use of a plurality of cam lobes 50 greatly reduces the average amount of crank handle rotation required to activate grasping mechanism 36.

Figure 11:
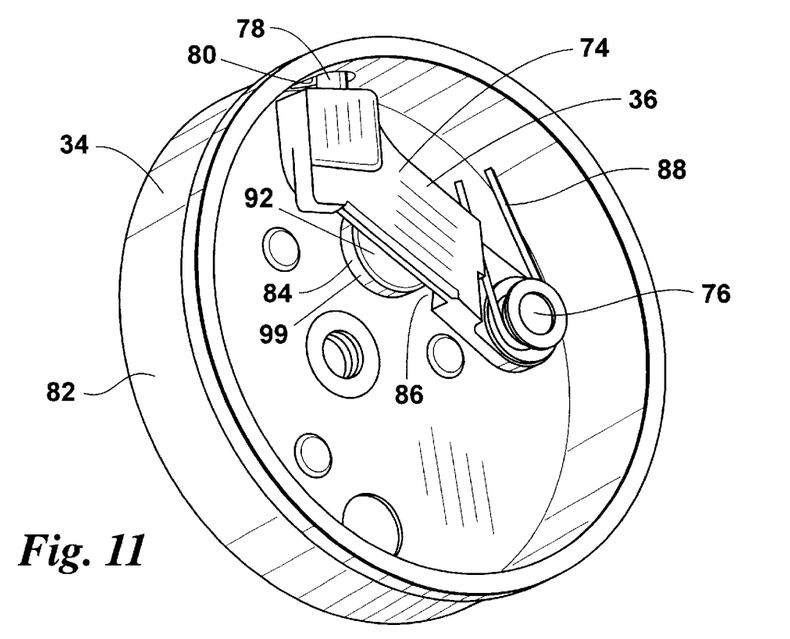
FIG. 11 provides a rear perspective view of a spinnerhead 34 employed in reel 4.
Figure 12:
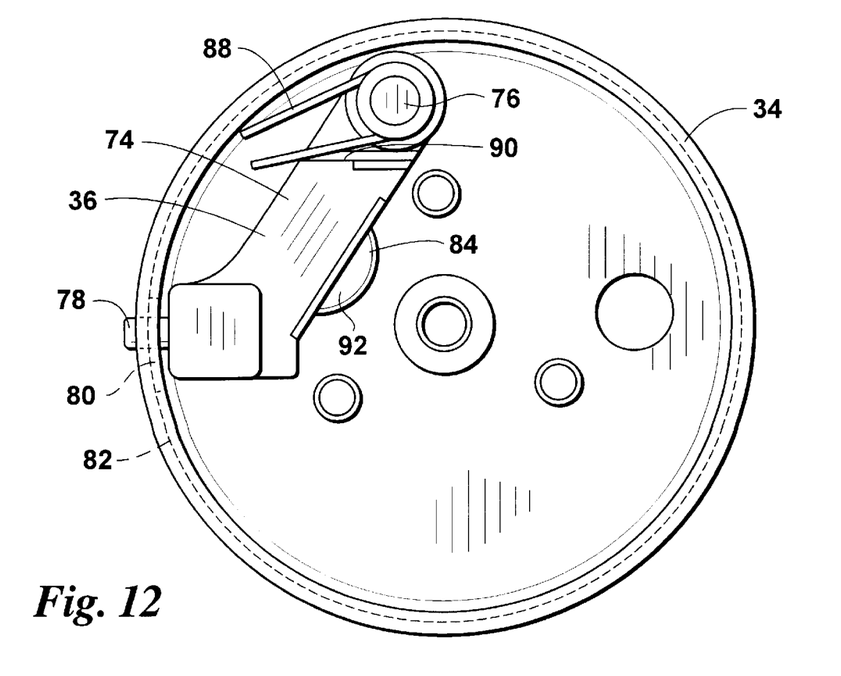
FIG. 12 provides an elevational rear view of spinnerhead 34.

The line-grasping mechanism 36 employed in reel 4 can be generally any type of line-grasping mechanism used in the art. As shown in FIGS. 11 and 12, line grasping mechanism 36 is preferably a standard, pick-up pin mechanism comprising: an arm 74 pivotably mounted in spinnerhead 34 by means of a pivot pin 76; a grasping pin 78 extending from the distal end of arm 74 such that pin 78 will project laterally through a slot 80 formed through the sidewall 82 of spinnerhead 34; a contacting disk 84 rotatably mounted in, and protruding from, a slot 86 formed in the forward side of arm 74; and a wire spring 88 retained around pivot pin 76. Spring 88 is positioned between (a) the interior surface of spinnerhead sidewall 82 and (b) a shoulder 90 formed on arm 74. Thus, spring 88 biases arm 74 and grasping pin 78 away from pin slot 80.

When the user presses thumb button 18 to begin the casting motion, main shaft 16 carries spinnerhead 34 and line-grasping mechanism 36 forward such that the contacting disk 84 of mechanism 36 is positioned beyond the cam lobes 50 of inventive bushing 2. Thus, spring 88 of mechanism 36 urges arm 74 radially inward such that grasping pin 78 is retracted from slot 80. When the user then releases thumb button 18 at the end of the casting motion, shaft spring 24 urges main shaft 16, spinnerhead 34, and line-grasping mechanism 36 rearwardly such that the rearward radial surface 92 of contacting disk 84 abuts the forward end 44 of inventive bushing 2. Thus, at this point, contact disk 84 will be positioned either (a) against the forward surface 94 of one of cam lobes 50 or (b) between the shoulders 96 of adjacent lobes 50. The abutment of disk surface 92 with the forward end 44 of bushing 2 limits the rearward movement of spinnerhead 34 and of grasping mechanism 36 such that grasping pin 78 is retained in retracted position. Spinnerhead 34 and grasping pin 78 thus do not interfere with the flow (i.e., payout) of the fishing line over the forward end of line spool 14.

Figure 1:
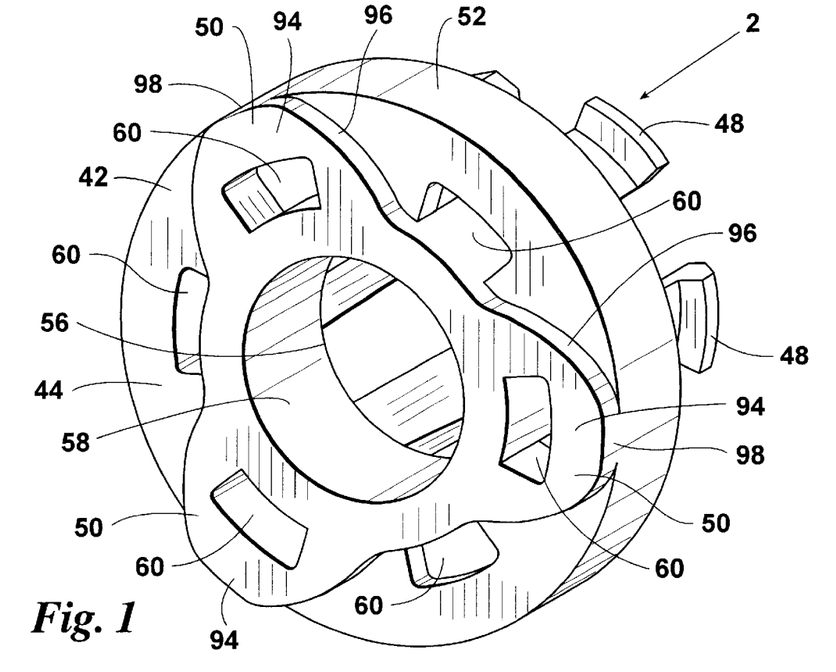
FIG. 1 provides a perspective front view of an embodiment 2 of the inventive bushing.
Figure 2:
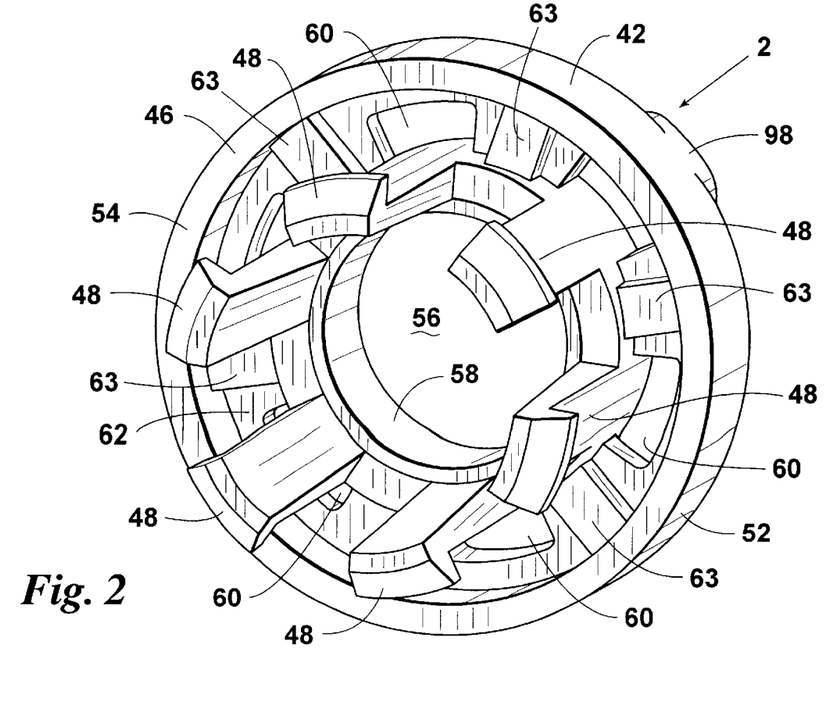
FIG. 2 provides a perspective rear view of inventive bushing 2.
Figure 3:
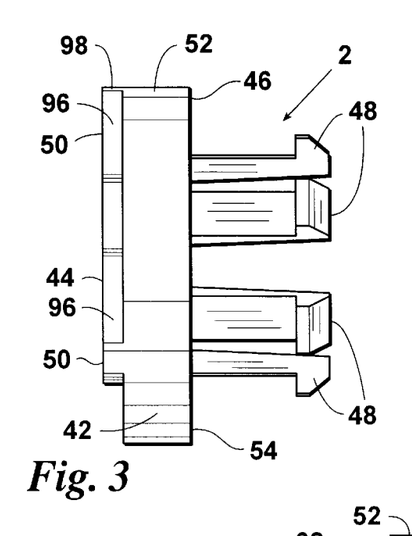
FIG. 3 provides an elevational side view of inventive bushing 2.
Figure 4:
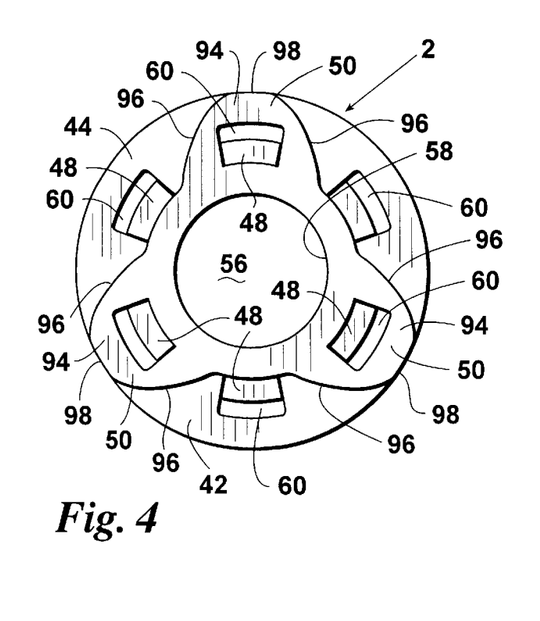
FIG. 4 provides an elevational front view of inventive bushing 2.
Figure 5:
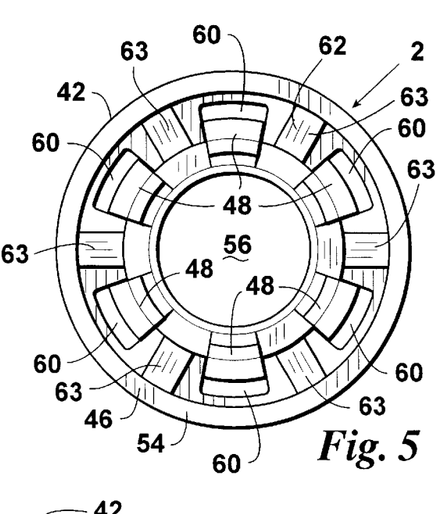
FIG. 5 provides an elevational rear view of inventive bushing 2.
Figure 6:
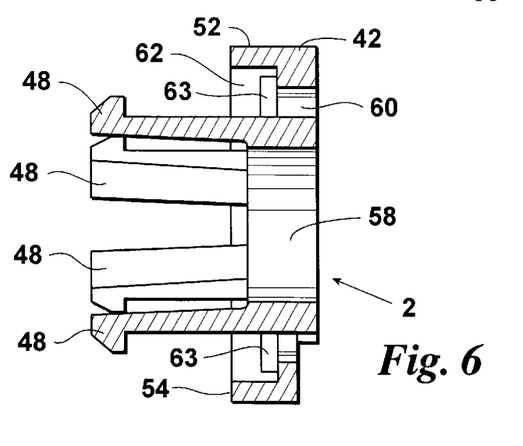
FIG. 6 provides a cutaway, elevational side view of inventive bushing 2.

When, at the end of the casting motion, the user desires to set and/or retrieve (i.e., wind) the fishing line, the user simply turns crank handle 30. The turning of crank handle 30 imparts rotational movement to main shaft 16 and to line-grasping mechanism 36. If contacting disk 84 is positioned against the forward surface 94 of a cam lobe 50, the rotation of mechanism 36 relocates disk 84 such that shaft spring 24 is allowed to pull disk 84 into position between the shoulders 96 of an adjacent pair of lobes 50. With disk 84 thus positioned between adjacent lobes 50, the continued rotation of mechanism 36 causes contacting disk 84 to ride along the shoulder 96 of one of lobes 50 such that arm 74 is forced to pivot outward. As seen in FIGS. 1, 3, and 4, the terminal point 98 of each lobe shoulder 96 is exactly flush with the cylindrical exterior wall 52 of inventive bushing 2. Thus, when mechanism 36 is rotated sufficiently to place contacting disk 84 at a terminal point 98, rearward disk surface 92 no longer abuts any portion of the forward end 44 of bushing 2 and shaft spring 24 is therefore allowed to pull spinnerhead 34 and line-grasping mechanism 36 fully rearward. When line grasping mechanism 36 is positioned fully rearward, the outer edge 99 of contacting disk 84 is positioned against, and rides around, the cylindrical exterior surface 52 of inventive bushing 2. With contacting disk 84 thus positioned against bushing surface 52, grasping pin 74 is retained in its fully projecting position and will operate to grasp the fishing line and wrap the line around spool 14.

Inventive bushing 2 is preferably formed from a sturdy, wear-resistant, low friction material. Examples of suitable materials include nylon, polycarbonate and acetal. The material will also preferably include a lubricant additive such as $MoS_2$, PTFE and/or silicon.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A bushing for a fishing reel having a shaft and a grasping means comprising:
   a body having a substantially uniform exterior diameter and an aperture therethrough for receiving the shaft such that the shaft is movable in said aperture and
   a plurality of chamfers, extending from said body, for securing said bushing in the fishing reel.

2. The bushing of claim 1 wherein said plurality of chamfers is operable for removably securing said bushing in said fishing reel.

3. The bushing of claim 1 wherein said plurality of chamfers is operable for securing said bushing on a spool hub of a spincast reel.

4. The bushing of claim 1 wherein said body includes an exterior contacting surface.

5. The bushing of claim 4 wherein:
   the grasping means includes a grasping position for grasping a fishing line and
   said exterior contacting surface is positioned such that said grasping means will operably contact said exterior contacting surface when said grasping means is in said grasping position.

6. The bushing of claim 1 further comprising a cam lobe provided on said body.

7. The bushing of claim 6 wherein:
   the grasping means capable of grasping a fishing line
   said cam lobe is operable for transferring the grasping means from a non-grasping position where in the grasping means does not grasp said fishing line to a grasping position wherein the grasping means will grasp said fishing line.

8. A bushing for a fishing reel having a shaft and a grasping mechanism, comprising:
   a body and
   transfer means, provided on said body, for transferring the grasping mechanism included in said fishing reel from (a) a nongrasping position wherein said grasping mechanism does not grasp a fishing line included in said fishing reel to (b) a grasping position wherein said grasping mechanism will grasp said fishing line.

9. The bushing of claim 8 further comprising securing means for securing said bushing in said fishing reel.

10. The bushing of claim 9 wherein said securing means comprises a plurality of chamfers extending from said body.

11. The bushing of claim 8 further comprising:
   receiving means for movably receiving the shaft included in said fishing reel and retaining means, operably contactable by the grasping mechanism, for retaining said grasping mechanism in said grasping position.

12. The bushing of claim 11 wherein:

said receiving means comprises an interior surface provided in said body and said retaining means comprises an exterior surface provided on said body.

13. The bushing of claim 8 wherein said transfer means comprises at least one cam lobe formed on said bushing.

14. A spincast fishing reel comprising:

a frame;

an elongate shaft;

a hub extending from said frame, said hub having a passage extending therethrough for receiving said shaft and said hub having an end;

a bushing for receiving and retaining said shaft for sliding and rotating movement of said shaft; and said bushing being secured at said end of said hub by a plurality of chamfers extending from said bushing, said chamfers being receivable in said passage.

15. The spincast fishing reel of claim 14 further comprising:

a spinnerhead attachable to an end of said shaft;

grasping means, provided in said spinnerhead, for grasping a fishing line; and transferring means, provided on said bushing, for transferring said grasping means from a nongrasping position wherein said grasping means will not grasp said fishing line to a grasping position wherein said grasping means will grasp said fishing line.

16. The spincast fishing reel of claim 15 wherein said bushing has an exterior surface extending around said bushing such that, when said grasping means is in said grasping position, said grasping means will contact said exterior surface and said exterior surface will thus retain said grasping means in said grasping position.

17. The spincast fishing reel of claim 15 wherein said transferring means comprises at least one cam lobe formed on said bushing.

18. The spincast fishing reel of claim 14 wherein said hub includes a terminal end having at least one radial groove therein to receive a radial boss formed in said bushing.

19. A spincast fishing reel, comprising:

a frame;

fishing line;

a spinner head including a fishing line grasping mechanism;

an elongate shaft which positions said spinner head;

a hub extending from said frame, said hub having a passage extending therethrough for receiving said shaft and said hub having an end;

a bushing having a body;

said bushing being removably secured at said end of said hub for receiving and retaining said shaft for sliding and rotating movement of said shaft within said bushing;

said body having an inner bearing surface for contact with said shaft;

said body having an exterior contacting surface such that said grasping mechanism will operably contact said exterior contacting surface when said grasping mechanism is in position to grasp said fishing line.

20. The spincast fishing reel of claim 19 further including:

said passage in said hub including a diameter;

said body of said bushing having an inner diameter which is not larger than the inner diameter of said hub.

* * * * *